United States Patent [19]

Parulski et al.

[11] Patent Number: 5,696,850
[45] Date of Patent: Dec. 9, 1997

[54] AUTOMATIC IMAGE SHARPENING IN AN ELECTRONIC IMAGING SYSTEM

[75] Inventors: Kenneth A. Parulski; Michael S. Axman, both of Rochester, N.Y.

[73] Assignee: Eastman Kodak Company, Rochester, N.Y.

[21] Appl. No.: 576,738

[22] Filed: Dec. 21, 1995

[51] Int. Cl.⁶ ............................................. G06T 5/00
[52] U.S. Cl. ..................... 382/261; 382/263; 348/231; 348/232; 348/233; 358/909.1; 395/109
[58] Field of Search ......................... 382/261, 263, 382/266, 254; 358/406, 442, 447, 443, 519, 906, 909.1, 523; 348/231, 232, 233, 552; 395/106, 109, 114

[56] References Cited

U.S. PATENT DOCUMENTS

| 4,394,688 | 7/1983 | Iida et al. ........................ 382/254 |
| 4,969,051 | 11/1990 | Sasaki ........................ 358/447 |
| 4,970,593 | 11/1990 | Cantrell . |
| 5,016,107 | 5/1991 | Sasson et al. . |
| 5,144,686 | 9/1992 | Takashi et al. ........................ 382/263 |
| 5,231,501 | 7/1993 | Sakai ........................ 348/231 |
| 5,475,441 | 12/1995 | Parulski et al. ........................ 348/552 |
| 5,477,264 | 12/1995 | Parulski et al. ........................ 348/231 |
| 5,506,617 | 4/1996 | Parulski et al. ........................ 348/552 |

OTHER PUBLICATIONS

"Characterizing digital image acquisition devices" by Stephen E. Reichenbach, Stephen K. Park and Ramkumar Narayanswamy. *Optical Engineering*, Feb. 1991, vol. 30 No. 2.

"TIFF/EP, A Flexible Image Format for Electronic Still Cameras", by Ken Parulski and George Lathrop, Eastman Kodak Company, Rochester, NY. Preprint from IS&T's 48th Annual Conference, May 1995.

*Primary Examiner*—Scott A. Rogers
*Attorney, Agent, or Firm*—David M. Woods

[57] ABSTRACT

Digital reproductions of any size made from images scanned from film or taken by an electronic camera are optimally sharpened in a system-wide operation. The images are captured by an imaging device having an electronic imager and subsequently reproduced in a reproduction device, both imaging and reproduction devices having respective modulation transfer functions. Initially, the imaging device modulation transfer function and the reproduction device modulation transfer function are stored in separate devices. After an image is captured with the imaging device, a system modulation transfer function is generated from the imaging device modulation transfer function and the reproduction device modulation transfer function. Then a sharpening function is generated from the system modulation transfer function and the sharpening filter function is applied to the image captured by the imaging device in order to sharpen the image.

51 Claims, 8 Drawing Sheets

AUTOMATIC IMAGE SHARPENING IN AN ELECTRONIC IMAGING SYSTEM

FIELD OF THE INVENTION

The invention pertains to optimal operation of an imaging system comprising an electronic imaging device and a reproduction device.

BACKGROUND OF THE INVENTION

As understood in the prior art, a digital imaging device is a device which uses an electronic sensor to capture an image either directly from an object or indirectly from a medium, such as film; signal processing to represent the captured signal numerically; and some storage device to preserve the numerical image data. It is further known for a digital imaging device to use a removable storage device, such as an integrated circuit memory card, to store images. For instance, U.S. Pat. No. 5,016,107 describes an electronic still camera utilizing image compression and providing digital storage in a removable memory card having a static random access memory. In this camera, the integrated circuits in the removable memory card store image data and a directory locating the data. The image data provided by the digital imaging device and stored in a memory card is ordinarily used to produce some type of display or print, for example, a digital print of optional size made from images scanned from film or taken by an electronic camera.

The image quality of digital prints can be improved by using an appropriate sharpening or "edge enhancement" filter. The appropriate filter depends on the characteristics of the image input source (digital camera or film plus scanner), the output printer, and the print size. In a prior art system, such as shown in FIG. 1, some amount of sharpening is normally performed in an input imaging device, such as a digital camera 10 or a film scanner 11, and in an output reproduction device, such as a display 12 or a printer 14. In this type of known electronic still photography system, the camera 10, or the scanner 11, includes a slot for receiving a removable memory card 16. The memory card 16 also interfaces with a memory card slot in a host computer 18, which also performs some amount of sharpening on the images downloaded from the memory card 16. Consequently, it is known for the different parts of the system to have their own sharpening algorithms; in particular, the camera 10 has a hardware sharpening filter 20, the host computer 18 has user selectable sharpening software 22, and the printer has a firmware sharpening filter 24.

The image quality of captured images can be improved by the selection of appropriate filters for the input imaging device and subsequent devices that process the captured images. For instance, in U.S. Pat. No. 4,970,593 (Cantrell), the modulation transfer function (MTF) of the uncorrected optical system is measured and an aperture correction function is created from an inverse of the MTF function to correct an image captured through the optical system. Some software packages, such as Adobe Photoshop™, used with the host computer 18 allow the user to select different levels of image sharpening as part of their image processing routines. The amount of sharpening in the printer 14 can sometimes be selected by the user, as can be done in the driver for the Kodak XL7700™ printer, which allows five preset choices of sharpening.

Unfortunately, in the case of the printer, the preset printer sharpening may under or over correct images, depending on the print size and image source, and user selection of the sharpening level is a trial and error process. In addition, providing sharpening processing in two or three different places (camera, host computer software, and printer) takes extra time and may cause an increase in noise or artifacts. What is needed is an automatic method for providing the optimum sharpening level, without user intervention, for the output print or display. Preferably this would be accomplished using only a single sharpening operation.

SUMMARY OF THE INVENTION

The aforementioned problems are solved with a technique for optimally sharpening digital prints of any size made from images scanned from film or taken by an electronic camera. The invention comprises a method, and apparatus and system for use therewith, for sharpening images captured by an imaging device having an electronic imager and subsequently reproduced in a reproduction device, both imaging and reproduction devices having respective spatial response functions. Initially, the imaging device spatial response function and the reproduction device spatial response function are stored. After an image is captured with the imaging device, a system spatial response function is generated from the imaging device spatial response function and the reproduction device spatial response function. Then a sharpening filter function is generated from the system spatial response function and the sharpening filter function is applied to the image captured by the imaging device in order to sharpen the image.

The advantage of the invention lies in its straightforward approach to automating the sharpening process. The preferred spatial response function, the MTF (modulation transfer function) of the image source, is measured and preferably stored in an image header file along with each image. The MTF of the printer is likewise measured, and preferably stored in a printer characterization file. Then, in a single sharpening operation, when the user requests a print from one of the digital images, the MTF of the source image is scaled appropriately for the output print size, and a "composite" MTF is calculated. An optimum sharpening filter is then calculated to equalize the system MTF, and used to sharpen the image. This avoids a plurality of separate sharpening algorithms, while providing an optimal sharpening of the image produced in the print or display.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
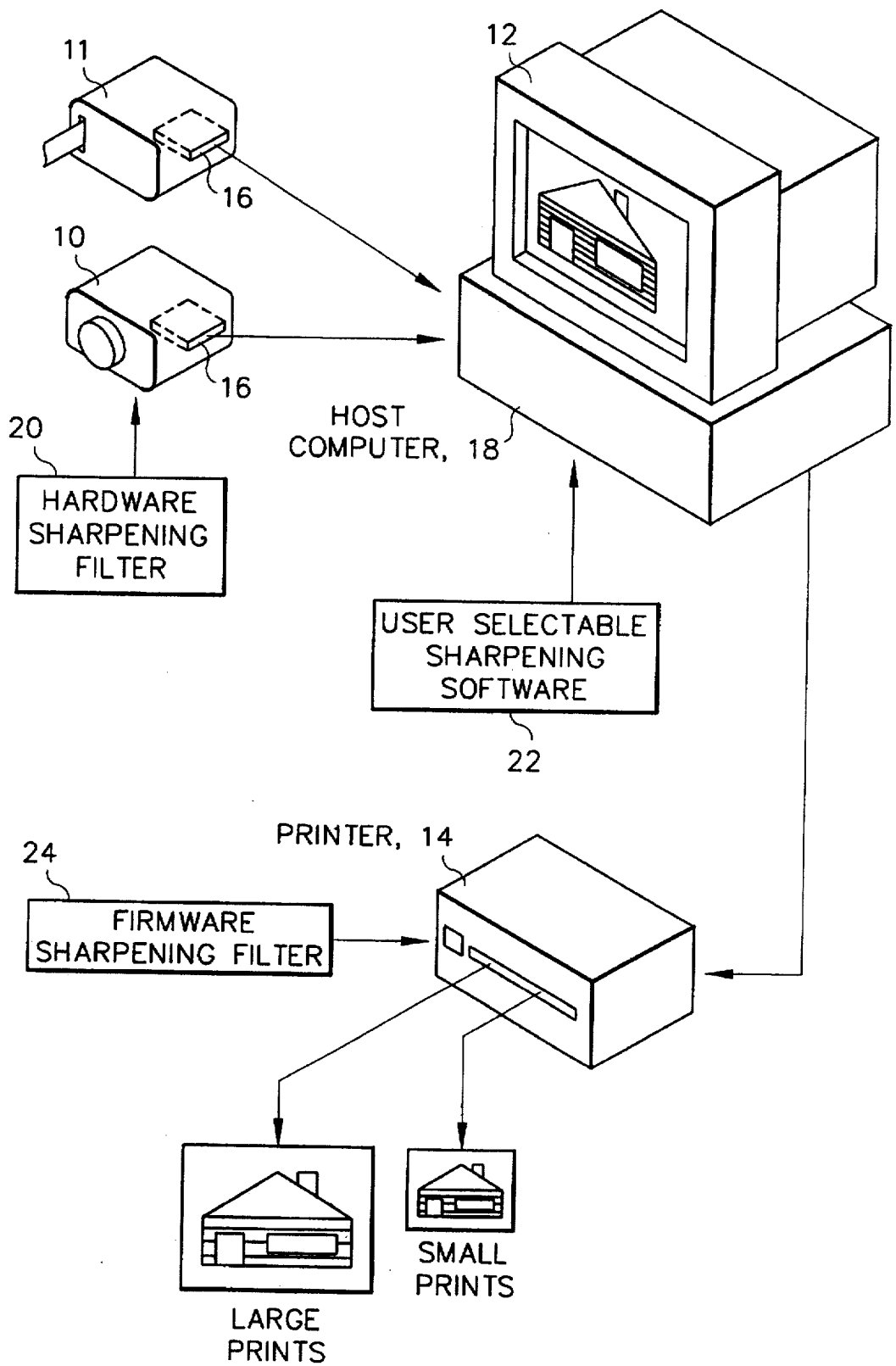
FIG. 1 is a diagram of a known electronic imaging system incorporating separate image sharpening at different stages of the system.

Because electronic imaging devices employing electronic sensors are well known, the present description will be directed in particular to elements forming part of, or cooperating more directly with, apparatus in accordance with the present invention. Elements not specifically shown or described herein may be selected from those known in the art. Certain aspects of the embodiments to be described are provided in software. Given the system description as described in the following materials, all such software implementation is conventional and within the ordinary skill in such arts.

One of the most important characteristics of an electronic imaging system is the ability of its imaging device to capture fine detail found in an original scene. This ability to resolve detail is determined by a number of factors, including the performance of the optical system, the number of addressable photo elements in the optical imaging device, and the electrical circuits in the camera, which may include image compression and gamma correction functions. Different measurement methods can provide different metrics to quantify the resolution of an imaging system, or a component of an imaging system, such as a lens. Resolution measurement metrics include resolving power, limiting resolution (at some specified contrast), modulation transfer function (MTF), and optical transfer function (OTF). Mathematically, the modulation transfer function is the modulus of the optical transfer function, which is the two-dimensional Fourier transform of the point spread function of the imaging system under consideration. The OTF is a complex function whose modulus (MTF) has the value unity at zero spatial frequency. Although the focus in this application is on use of the modulation transfer function to characterize the resolution of the capture and output devices, other metrics could be used, for example the OTF, spatial frequency response or depth of modulation level at various spatial frequencies. These are all various forms of spatial transfer functions that can be used to characterize the sharpness of an image from an imaging device.

The advantage of the spatial transfer functions is that they provide information about image quality over a range of frequencies rather than just at the limiting frequency as does resolving power. More particularly, the modulation transfer function is a graph (i.e., a set of discrete modulation factors) that represents the image contrast relative to the object contrast on the vertical axis over a range of spatial frequencies on the horizontal axis, where high frequency corresponds to small detail in an object. If it were possible to produce a facsimile image, the contrast of the image would be the same as the contrast of the object at all frequencies, and the MTF would be a straight horizontal line at a level of 1.0. In practice, the lines always slope downward to the right, since image contrast decreases as the spatial frequency increases. Eventually the lines reach the baseline, representing zero contrast, when the image-forming system is no longer able to detect the luminance variations in the object. The MTF can be determined for each component in an image-forming system or for combinations of components. The MTF for a system can be calculated by multiplying the modulation factors of the components at each spatial frequency. Since the MTF curves of all of the devices in a system are multiplied together point by point to provide the system MTF curve, the system curve is also a downwardly sloping function diminishing to zero resolution as the spatial frequency increases.

This downwardly sloping characteristic results in a gradual loss of contrast in the detail of the image as the detail becomes finer and finer. For example, all optical devices have a non-ideal MTF response curve because of the finite size of the optical aperture associated therewith. The MTF curve of such optical devices is normally a monotonically decreasing function such as a downwardly sloping diagonal line, i.e., a set of diminishing modulation factors, that intersects the spatial frequency axis at a point of frequency less than or equal to the diffraction limit-the point at which contrast or resolution diminishes to zero. A filter can be designed with a transfer function to compensate for the diffraction effects of the finite size of the optical aperture of the system. If the filter curve is the inverse of the system MTF curve, the composite curve will be substantially flat out to the diffraction limit. The filter thus boosts the high spatial frequency contrast to compensate for the downwardly sloping characteristic of the system MTF.

Figure 2:
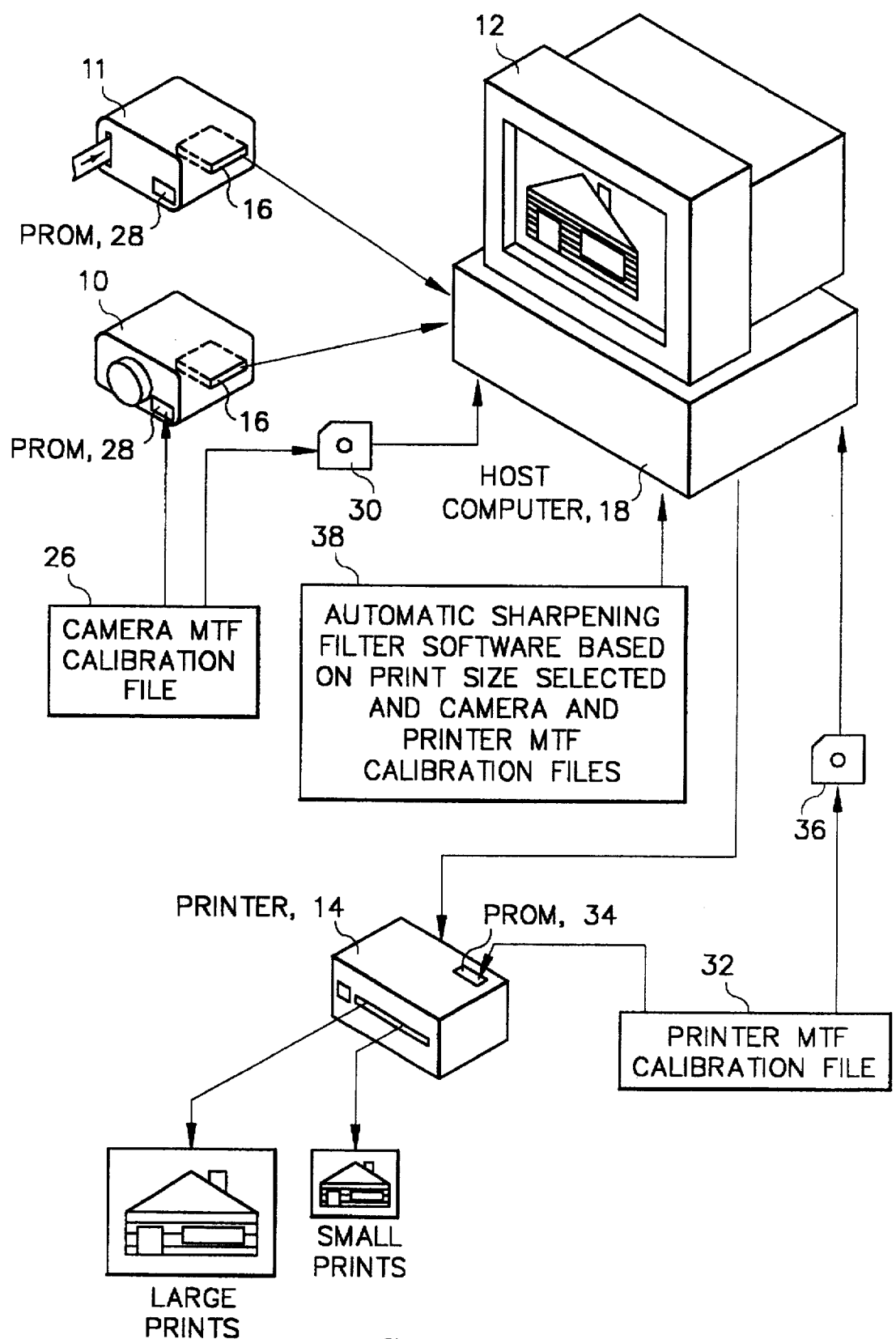
FIG. 2 is a diagram of an electronic imaging system incorporating system image sharpening at a single stage of the system according to the invention.

A diagram of a system utilizing our invention is shown in FIG. 2. Optical devices and systems such as lenses, electronic image sensors, video monitors, digital printers, filters, and the like all have a response to spatial frequency denoted by their spatial response functions, such as their MTF curves. In particular, the camera or scanner manufacturer characterizes the MTF of the camera 10 or the scanner 11 (relative to the camera or scanner sampling frequency), and records this information as a camera (or scanner) MTF calibration file 26 in a PROM (programmable read-only memory) 28 in the camera (or scanner), or in a computer file 30 supplied with the camera 10 (or scanner 11). Likewise, the printer MTF is similarly characterized (relative to the printer sampling frequency), and recorded as a printer MTF calibration file 32 in a PROM 34 in the printer 14 or in a computer file 36 supplied with the printer. A typical computer file 30 or 36 would be a floppy magnetic disk with the calibration file stored thereon along with program code for enabling an external device to access the calibration file. Both the camera (or scanner) and disk, or the printer and disk, would be supplied together as a kit by the manufacturer to the purchaser.

The host computer 18 contains automatic sharpening filter software 38, stored in conventional program memory, which generates a system MTF from the camera MTF calibration file 26 and the printer MTF calibration file 32. In addition, the selected print size is used to adjust the spatial frequency axis scale of the camera or scanner MTF relative to the printer MTF. This is desirable because different sized prints from the same digital image source are optimally reproduced with different sharpening levels. The user decides what size print to make from the camera image. The system MTF without sharpening is calculated by adjusting the spatial frequency axis of the camera to correspond to that of the printer (if the pixels of the camera are not mapped one-to-one to the pixels of the printer) and multiplying the two MTF curves. A sharpening filter is calculated to normalize this response either to unity (in which case the sharpening filter is an inverse filter), or to any other desired system curve shape. The filter is then applied to the image data to sharpen the image produced by the printer 14 (or the display 12).

Figure 3:
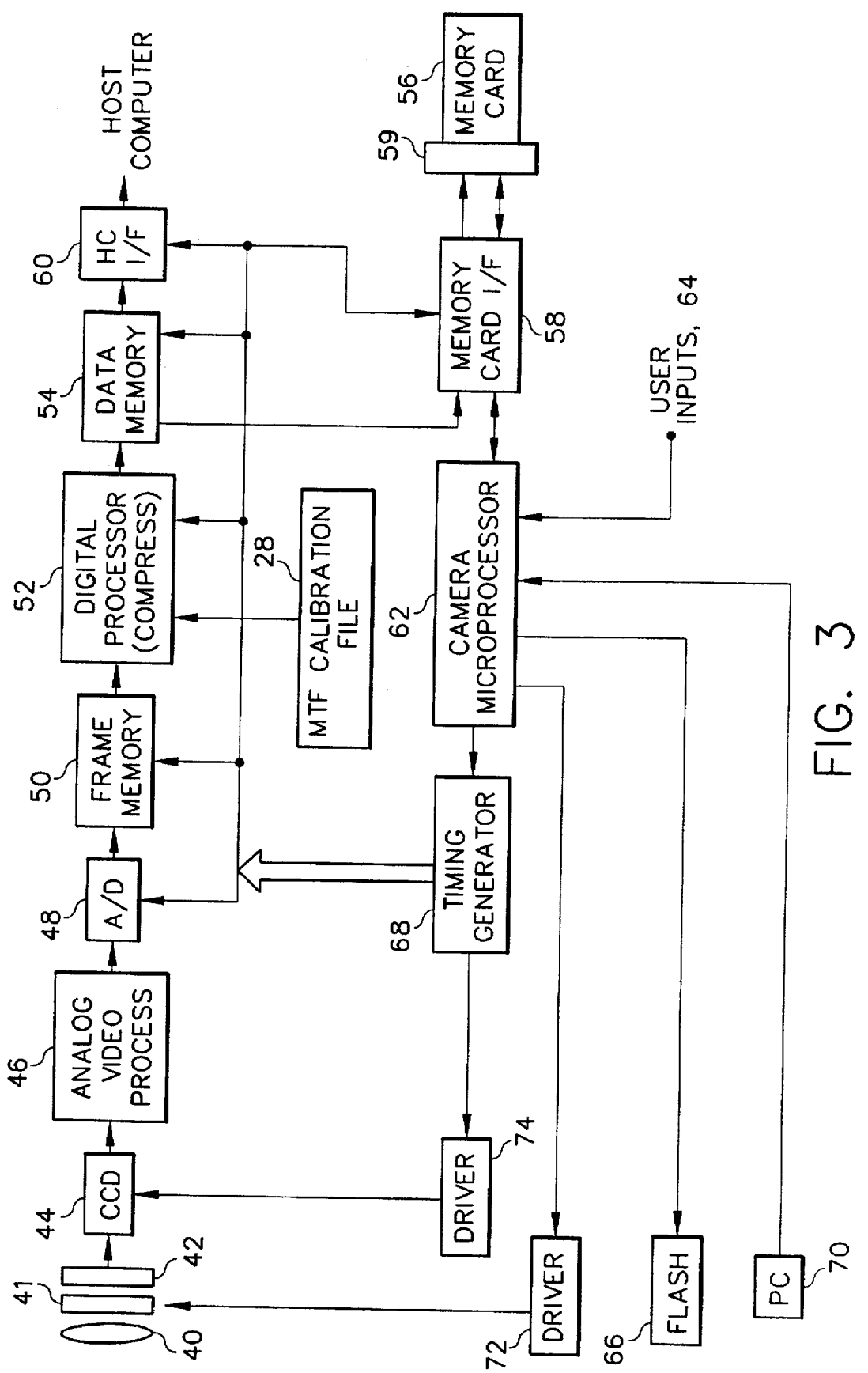
FIG. 3 is a block diagram of an electronic camera incorporating a camera MTF calibration file.
Figure 4:
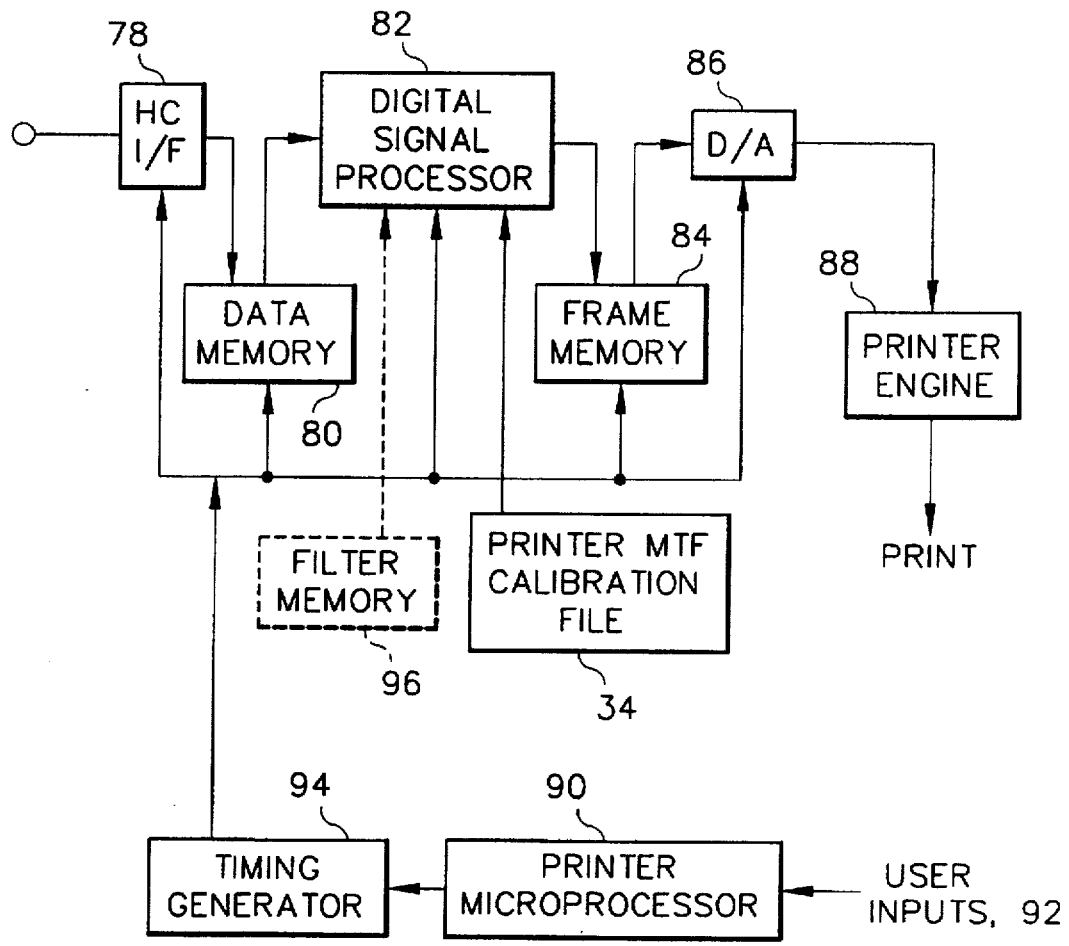
FIG. 4 is a block diagram of a printer incorporating a printer MTF calibration file.

FIGS. 3 and 4 show block diagrams of exemplary embodiments of the camera 10 and the printer 14, respectively. While not shown specifically in the figures, an exemplary scanner would contain elements similar to those shown in FIG. 3 for a camera with an added mechanism in the optical stage for positioning a film strip in the optical axis. Likewise, a display 12 would contain similar blocks to those shown in FIG. 4 for a printer, except the output would be to a cathode ray tube, or the like, and associated scanning electronics.

Referring first to FIG. 3, a lens 40 directs image light from a subject (not shown) through an aperture/shutter controller 41 and a blur filter 42 upon an image sensor, which is preferably a charge coupled device (CCD) sensor 44. The sensor 44 generates an image signal that is processed by an analog video processor 46 before being converted into a digital image signal by an analog to digital (A/D) converter 48. The digitized image signal is temporarily stored in a frame memory 50, and then compressed by a digital signal processor 52. The compressed image signal is then stored in a data memory 54 or, if a memory card 56 is present in a memory card slot of the camera, transferred through a memory card interface 58 to the memory card 56. In this embodiment, the memory card is adapted to the PCMCIA card interface standard, such as described in the *PC Card Standard, Release* 2.0, published by the Personal Computer Memory Card International Association, Sunnyvale, Calif., September, 1991.

Electrical connection between the memory card 56 and the camera 10 is maintained through a card connector 59 positioned in the memory card slot. The card interface 58 and the card connector 59 provide, e.g., an interface according to the aforementioned PCMCIA card interface standard. The compressed image signal may also be sent to the host computer 18 (see FIG. 2), which is connected to the camera 10 through a host computer interface 60. A camera microprocessor 62 receives user inputs 64, such as from a shutter release, and initiates a capture sequence by triggering a flash unit 66 (if needed) and signaling a timing generator 68. The timing generator 68 is connected generally to the elements of the camera 10, as shown in FIG. 3, for controlling the digital conversion, compression, and storage of the image signal. The microprocessor 62 also processes a signal from a photodiode 70 for determining a proper exposure, and accordingly signals an exposure driver 72 for setting the aperture and shutter speed via the aperture/shutter controller 41. The CCD sensor 44 is then driven from the timing generator 68 via a sensor driver 74 to produce the image signal.

Figure 5A:
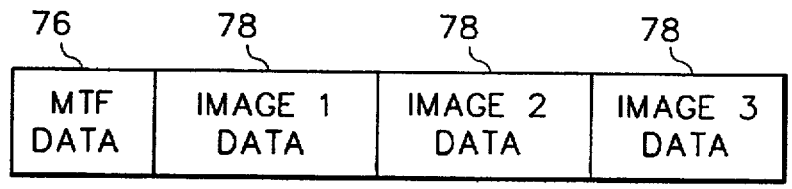
FIGS. 5A and 5B are examples of data structures incorporating MTF data in a header record.
Figure 5B:
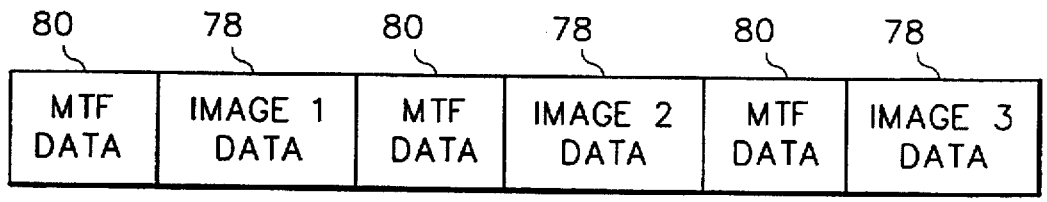

The MTF calibration file 26 is contained either in the camera PROM 28, which is connected to the digital signal processor 52, or in the computer file 30. Typically, the MTF would characterize the optical system comprising the lens 40, the blur filter 42, the CCD 44, and any other elements in the optical chain, such as infrared filters, color filter arrays, or the like. If the MTF is in the camera, the PROM 28 contains a table of calibration coefficient data, i.e., modulation factors, which are supplied with the image data to the host computer. FIGS. 5A and 5B show two examples of data structures that may be used to transfer the MTF coefficient data and the image data. In FIG. 5A, the digital signal processor 52 writes the MTF data into a camera header 76, followed by individual image trailer records 78. In FIG. 5B, the MTF data is written into individual camera headers 80 together with individual image trailer records 78. Alternatively, the camera MTF data may be contained in the computer file 30 (instead of in the PROM 28), which is provided as a floppy disk or the like in combination with the camera 10 (or the scanner 11). The MTF data is then accessed by the host computer 18 through a conventional disk drive interface(not shown) when the user loads the disk into the interface.

FIG. 4 shows a block diagram of the printer 14. A host computer interface 78 receives digital image data from the host computer 18 and stores the image data in a printer data memory 80. A digital signal processor 82 processes the digital image data, e.g., decompressing the image data, and stores the processed digital image data in a printer frame memory 84. The digital image data is then converted into an analog signal by a digital-to-analog (D/A) converter 86 and applied to a printer engine 88, which produces the printed output. Depending on the type of printing technology involved, the printing engine 88 could be a thermal printer, an inkjet printer, an electrophotographic printer, or the like. A printer microprocessor 90 receives user inputs 92, such as from a printer start switch, and initiates a printing sequence by signaling a timing generator 94. The timing generator 94 is connected generally to the elements of the printer 14 for controlling the reception, processing, and conversion of digital image data. Alternately, the printing sequence could be initiated by digital command codes received from computer 18 via host computer interface 78.

The printer MTF calibration file is stored either in the printer PROM 34 or in the computer file 36. In one embodiment, in which the printer contains the MTF data, the printer 14 also contains the automatic sharpening filter software 38 in a filter memory 96 (shown in broken line to indicate that it is optional to this embodiment). The digital signal processor 82 recovers the camera MTF calibration file 26 from the header 76 (or 80) accompanying the digital image data, which is read through a card interface (not shown), retrieves the printer MTF calibration file 32 from the PROM 34, and performs the sharpening algorithm stored in the filter memory 96. In another embodiment, the host computer 18 contains the filter software 38 and performs the sharpening algorithm. In the latter embodiment, the host computer interface 78 is a two-way interface and communicates the printer MTF calibration file 32 to the host computer 18 for use in the automatic sharpening algorithm. Alternatively, the printer MTF data may be contained in the computer file 36 (instead of the PROM 34), which is provided to the user as a floppy disk or the like in combination with the printer 14. The MTF data is then accessed by the host computer 18 (or the printer 14) through a conventional disk drive interface(not shown) when the user loads the disk into the interface.

Figure 6:
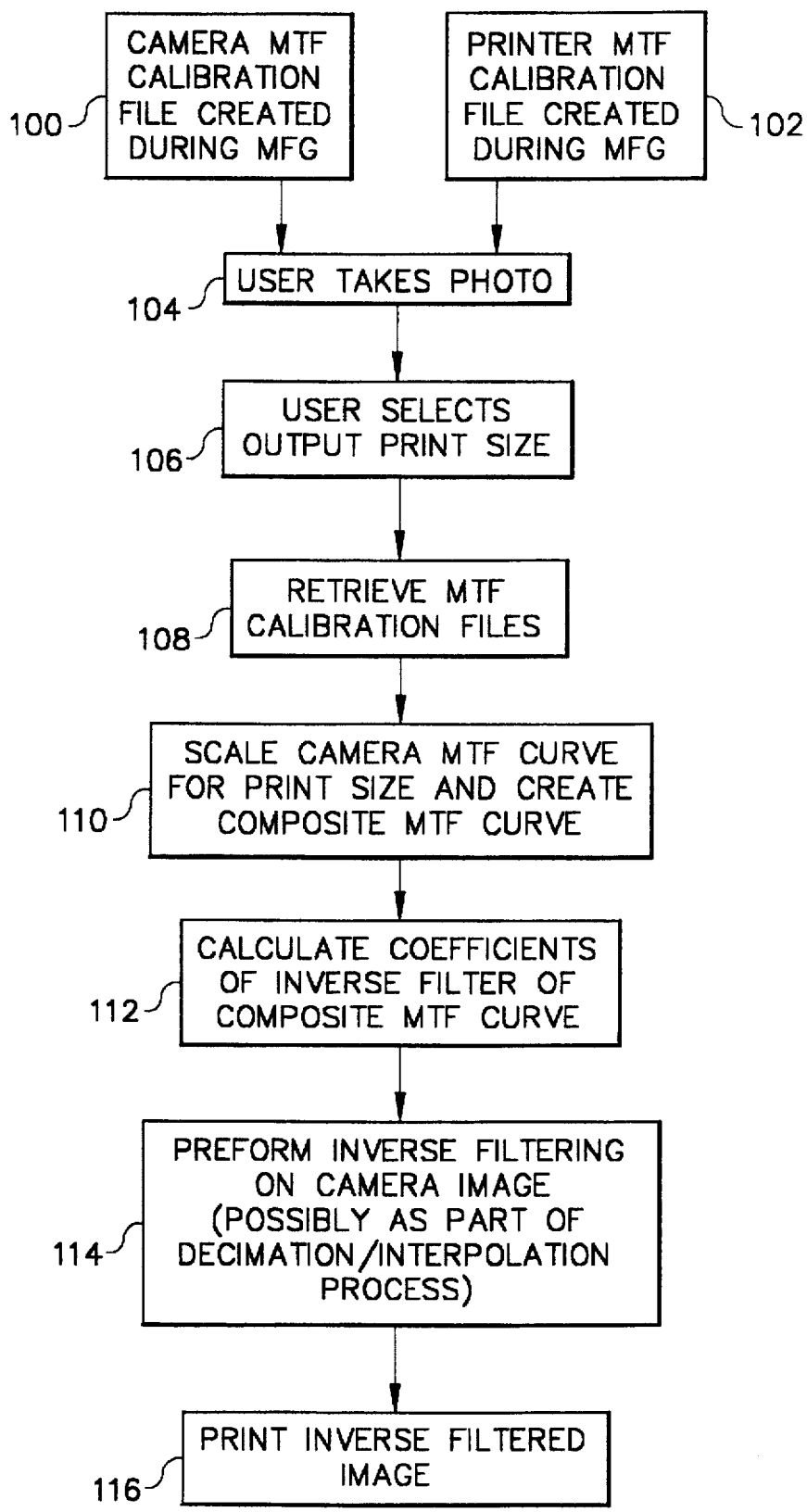
FIG. 6 is a diagram of the process for operating the system of FIG. 2 to provide image sharpening.

A flowchart of the sharpening process is shown in FIG. 6 for an electronic camera and a printer. Initially, in steps 100 and 102, the manufacturer of the imaging device and the reproduction device characterizes the respective modulation transfer functions with respect to the sampling frequencies of the respective devices. A conventional method of measuring MTF is to utilize a graduated series of bar charts, either square wave or sinusoidal, and to measure the difference in the video between the black areas and the white background with, e.g., an oscilloscope. Three steps are basically involved in the preparation of the modulation transfer function: first, determine the modulation of the bar charts and the modulation of the image at each frequency; second, determine the modulation factor at each frequency by dividing the image modulation by the chart modulation; and third, prepare the modulation transfer function by plotting modulation factors against spatial frequencies.

Next, the user operates the camera 10 or scanner 11 to record an image (step 104) and, in the printing stage, selects an output print size (step 106). In step 108, the respective calibration files are retrieved from the PROMS 28 and 34, or computer files 30 and 36. The system MTF is then calculated in step 110 by scaling the camera MTF function to the selected print size (by adjusting the frequency axis of the camera to correspond to that of the printer) and by multiplying the scaled camera MTF point-by-point with the printer MTF. The scaling operation effectively adjusts the number of camera pixels per image height to match the number of printer pixels per image height for the print size selected by the user. The coefficients of the inverse filter are calculated in step 112 by inverting the system MTF curve on a point by point basis to provide the spatial frequency domain of the desired inverse filter. Inverse filter coefficient values that provide the desired inverse filter spatial frequency characteristic can then be calculated using conventional filter design techniques, for example as described in *Digital Signal Processing* by Alan Oppenheim and Ronald Schafer, ©1975, Prentice-Hall. Inverse filtering is then performed in step 114 by applying the inverse filter to the camera image data. The filtered image data is then used to print an inverse filtered image (step 116).

Figure 7:
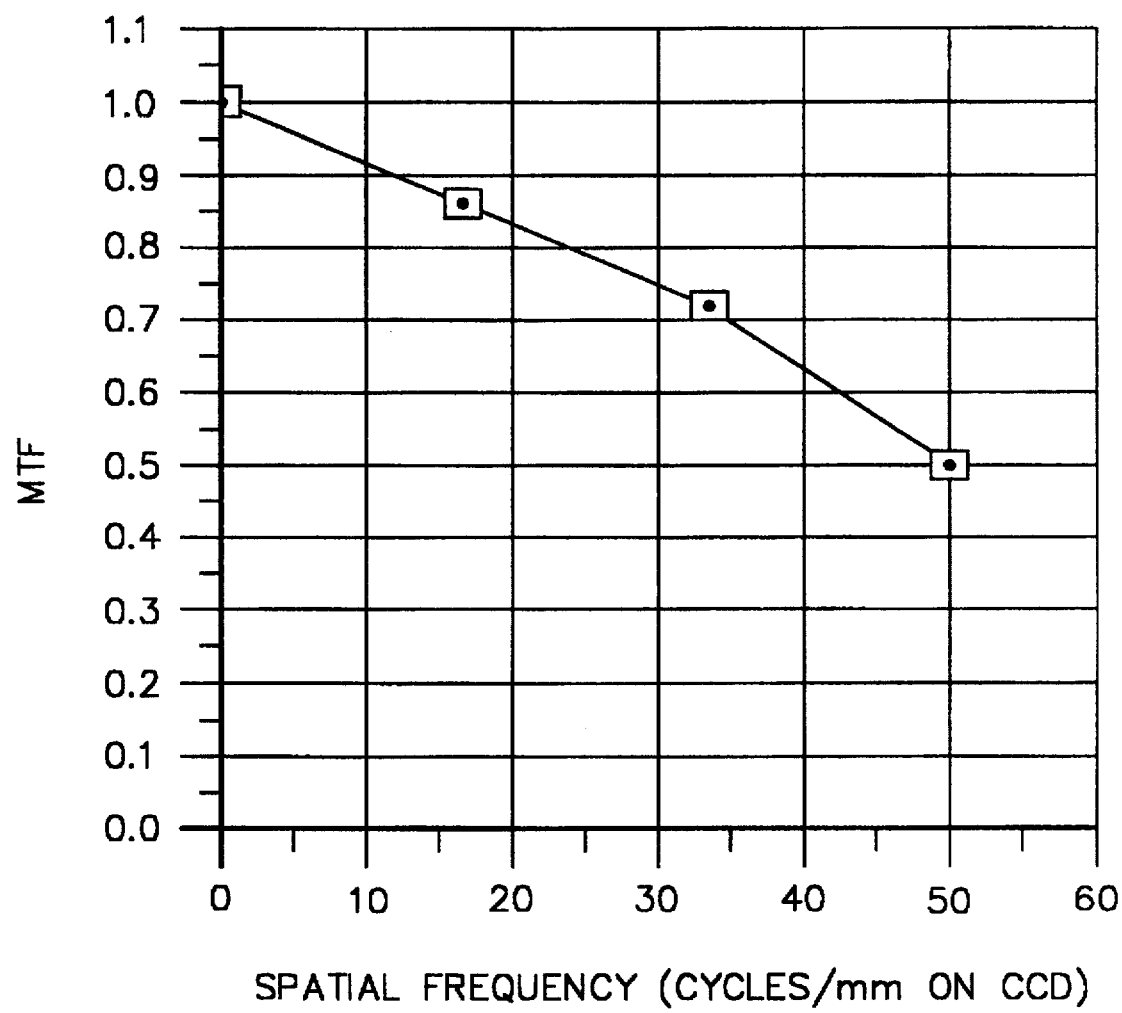
FIGS. 7–10 show MTF curves for various stages of the electronic imaging system.
Figure 8:
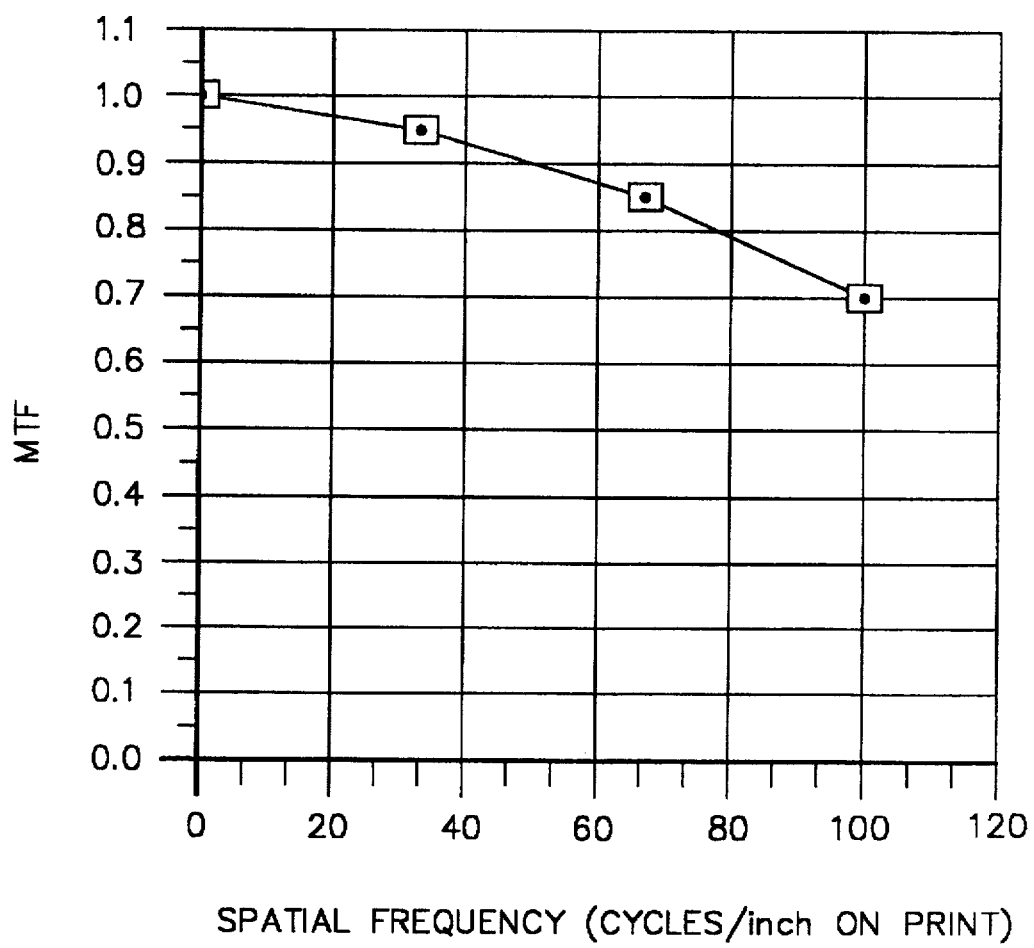
Figure 9:
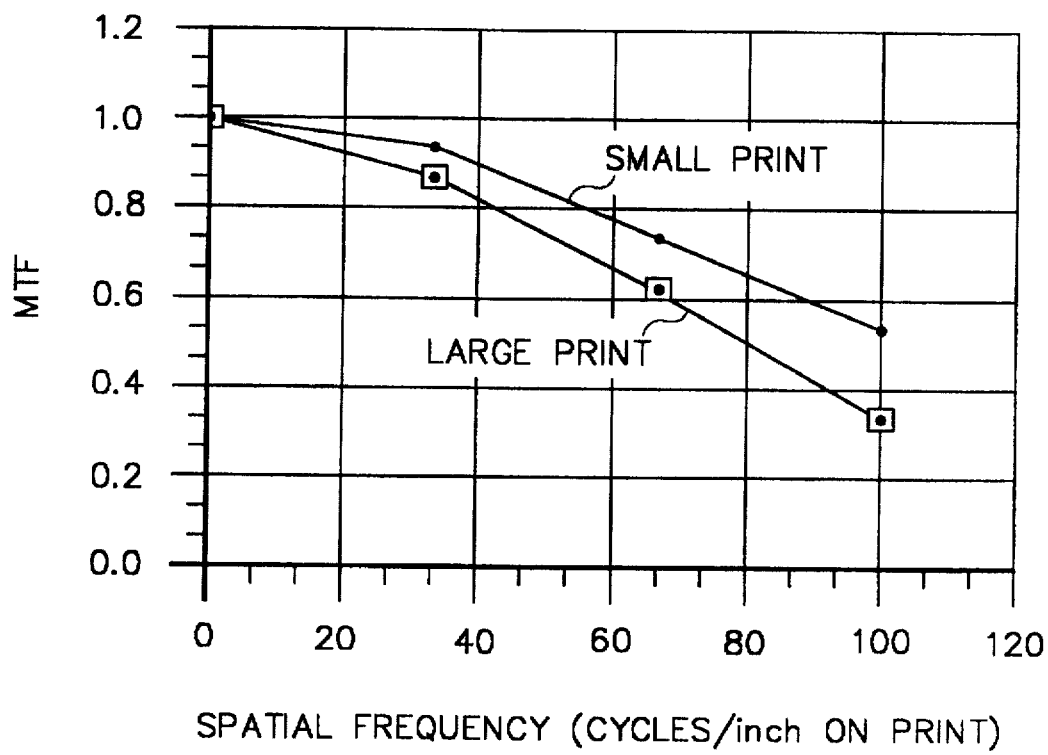

FIGS. 7–10 show example MTF curves for the various steps just described. FIG. 7 shows the MTF of the camera 10, which has a CCD sensor 44 with 9 micron pixels. The x-axis shows cycles per mm on the CCD sensor. FIG. 8 shows the MTF of the thermal printer, which has a 200 pixels per inch print head in the printer engine 88. The x-axis shows cycles per inch on the print. FIG. 9 shows two different system MTF curves for two different size prints using the camera MTF of FIG. 7 and the printer MTF of FIG. 8. The x-axis shows cycles per inch on the print.

The difference in the two curves in FIG. 9 is due to the difference in printer magnification, which determines the spatial frequency axis scaling between the camera MTF and the printer MTF. For example, if the image sensor in the camera has 1000 rows of pixels with a 9 micron spacing between rows, the sensor sampling frequency equals approximately 110 cycles per mm. A printer with a 200 pixels per inch head has a sample frequency of 200 cycles per inch. If the user chooses to produce a 5 inch tall print from the camera, the camera pixels will be printed "one for one", since there are 1000 rows of camera pixels which will be used to produce a print having 1000 rows of pixels within the 5 inch print height. Therefore, the camera MTF curve will be scaled in the horizontal direction so that a frequency of 55 cycles per mm corresponds to 100 cycles per inch on the print. After this scaling, the camera MTF curve, now expressed as a function of cycles per inch on the print, is multiplied point by point with the printer MTF curve shown in FIG. 8 to produce the "large print" uncorrected system MTF curve shown in FIG. 9.

If the user instead chooses to print a 2.5 inch tall print from the camera, the camera pixels will be printed "two for one" (two camera pixels for each printer pixel), since there are 1000 rows of camera pixels which will be used to produce a print having 500 rows of pixels within the 2.5 inch print height. Therefore, the camera MTF curve will be scaled in the horizontal direction so that a frequency of 55 cycles per mm corresponds to 200 cycles per inch on the print. After this scaling, the camera MTF curve, in cycles per inch on the print, is multiplied point by point with the printer MTF curve shown in FIG. 8 to produce the "small print" uncorrected system MTF curve shown in FIG. 9.

In all cases, the camera MTF curve is scaled relative to the printer MTF curve by an amount proportional to the print magnification. For example, the user may decide to make a 2.5 inch tall print using only a portion of the camera image, for example only 500 out of the 1000 rows, by cropping the camera image prior to printing. In this case, the camera pixels will again be printed "one for one", since the 500 rows of camera pixels will be used to produce a print having 500 rows of pixels within the 2.5 inch print height. Therefore, the camera MTF curve will be scaled in the horizontal direction so that a frequency of 55 cycles per mm corresponds to 100 cycles per inch on the print, as in the case of the "large print" described above. After this scaling, the camera MTF curve is multiplied point by point with the printer MTF curve to produce a curve similar to the "large print" curve shown in FIG. 9.

Figure 10:
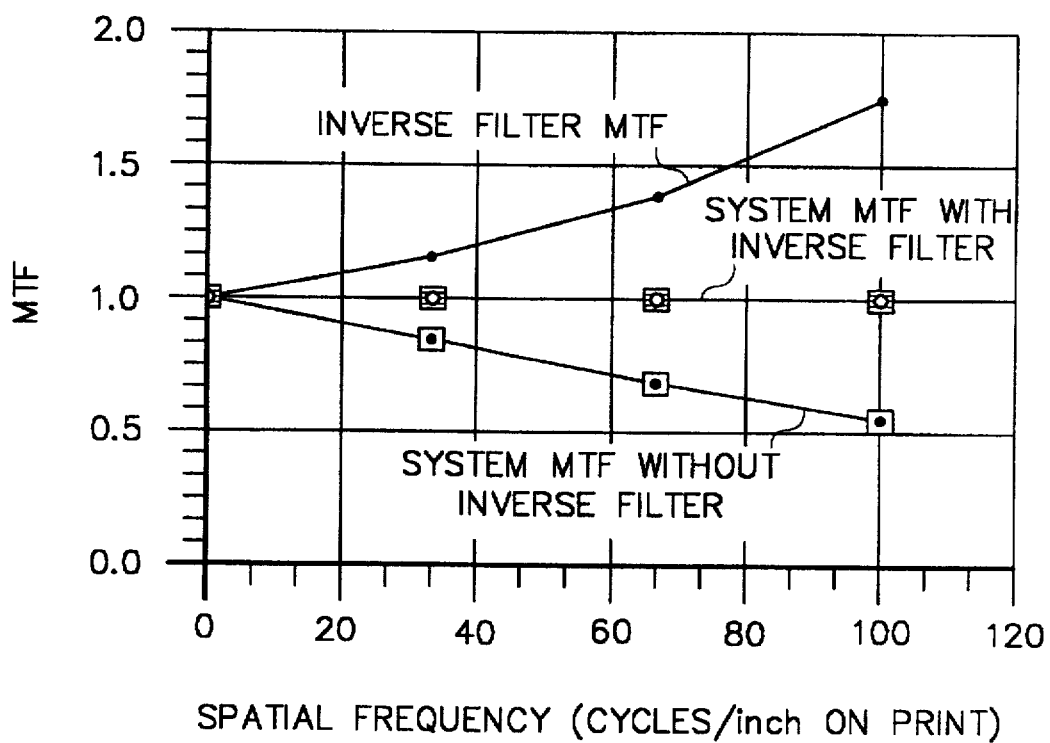

FIG. 10 shows the inverse filter MTF, the system MTF without inverse filtering (same as the small print system MTF from FIG. 9), and the final system MTF, for the smaller print size curve from FIG. 9. The inverse filter frequency response characteristic shown in FIG. 10 can be approximated using a conventional seven-tap symmetric finite impulse response (FIR) filter having coefficients equal to −0.03, +0.06, −0.17, +1.28, −0.17, +0.06, −0.03. To provide sharpening in the horizontal direction, the filter output for any pixel is set equal to 1.28 times the pixel input value, minus 0.17 times the sum of the horizontally adjacent pixels, plus 0.06 times the sum of the pixel values two pixel positions to the left and right of the input pixel, minus 0.03 times the sum of the pixel values two pixel positions to the left and right of the input pixels. To provide vertical sharpening, the filter is applied using the pixels immediately above and below the input pixel. This FIR filter is applied to the camera pixel data in both the horizontal and vertical direction, prior to printing, in order to provide a "flat" (unity) corrected system MTF after inverse filtering as shown in FIG. 10, for the small print size. To provide an appropriate inverse filter for the uncorrected large print system MTF shown in FIG. 9, the seven-tap filter coefficients should equal −0.08, +0.17, −0.38, +1.58, −0.38, +0.17, −0.08. Therefore, different filter coefficients, providing different amounts of sharpening designed to produce similar final system MTF responses, are used for different size prints made from the same digital camera on the same digital printer.

For any print sizes except those providing "one for one" printing, an interpolation or decimation filter is used to provide, using the camera pixels as the input, a greater or smaller number of pixels as required by the printer to produce the desired print size. While such interpolation or decimation filtering is normally performed in the printer, it is possible to perform this operation in combination with the sharpening filter just described.

In some applications, it may be desirable to limit the maximum value of the sharpening filter MTF to limit the increase in the visible noise resulting from the large gain of the inverse filter at high spatial frequencies. For example, the gain may be limited to a maximum value of 2 or 4, depending on the noise level of the camera. In this case, the sharpening filter coefficients are calculated so that the filter response does not exceed the desired maximum gain level at any point within the spatial frequency bandwidth of the printed image, that is for any frequency up to 100 cycles/mm for a 200 pixels per inch printer. By measuring the noise level of the digital camera, the desired maximum gain level can be set appropriately for a given camera. Noisier cameras are given proportionally lower maximum gain values.

In some applications, it may be desirable to produce a non-unity system MTF after the sharpening filter operation, for example one where the middle frequencies have a system MTF somewhat greater than unity, in order to provide a subjectively "crisper" image. In such a situation, the sharpening filter coefficients are calculated so as to compensate for the camera and printer MTFs and provide this desired non-unity response curve.

In the embodiment shown in the figures, the camera and printer MTFs are the same in both the vertical and horizontal directions, so only a single curve is shown. In this case, the same sharpening filter is applied in both the horizontal and vertical directions, either using cascaded separable horizontal and vertical filters, or a single two-dimensional filter. In some cases, the camera MTF or the printer MTF may be different for the vertical and horizontal directions. In such cases, the sharpening filters will be different in the horizontal and vertical directions.

The technique can also be used for optimally sharpening images for soft display on, e.g., the display 12. In this case, the soft display MTF characteristics are stored in a PROM in the display, or in a computer file supplied with the display. The display is then treated the same as the printer as described heretofore. The MTF of the image data supplied to the display is adjusted by an inverse filter appropriate to correct the camera image data for the size of the picture on the display.

Figure 11:
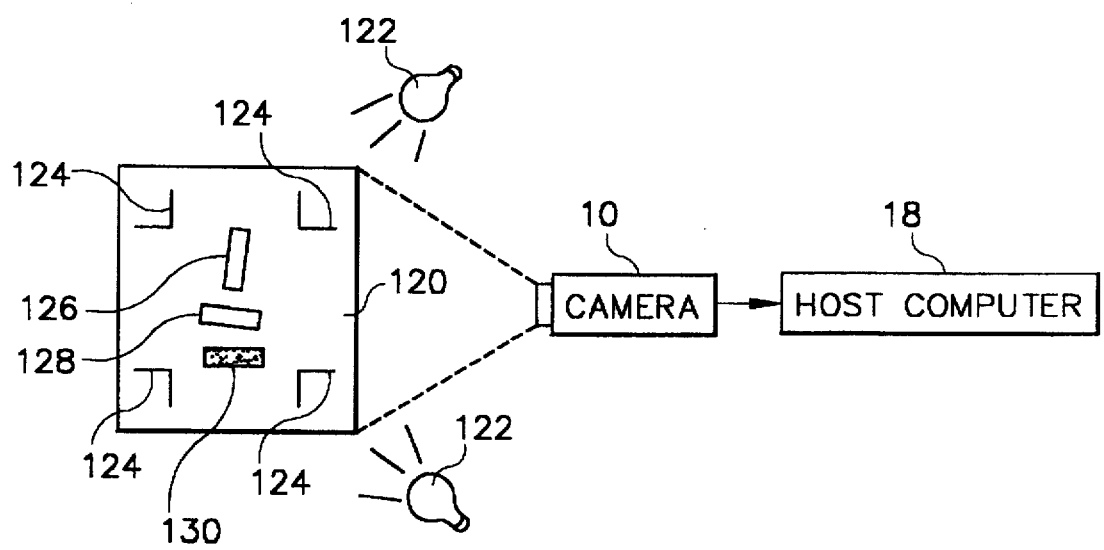
FIG. 11 shows an arrangement for automatically measuring the MTF and noise level of a digital camera.

The measurement of the modulation transfer function for imaging devices and reproduction devices is a well-established technique and well-known to those of ordinary skill in this art. For example, FIG. 11 shows an arrangement for automatically measuring the MTF and noise level of a digital camera. The camera 10 captures a picture of a reflection test chart 120 which is illuminated by lamps 122. An image of the chart is captured by the camera 10 and transferred to the host computer 18 via a cable or memory card 16. The computer analyzes the camera data of the chart image in order to automatically calculate the camera MTF and noise level. The chart 120 includes four registration marks 124, a slightly slanted vertical bar 126, a slightly slanted horizontal bar 128, and a uniform grey patch 130. The registration marks 124 are used by the software on the computer 18 to determine the exact location of the other chart features, so that minor errors in the framing of the camera 10 relative to the chart 120 do not affect the camera measurement. The camera pixel data along one edge of the slightly slanted vertical black bar 126 is used to measure the horizontal camera MTF, using the method described by S. E. Reichenbach, et al, in "Characterizing digital image acquisition devices", *Optical Engineering*, Vol. 30, No. 2, February 1991, pp. 170–176. Similarly, the camera pixel data along one edge of the slightly slanted horizontal black bar 128 is used to measure the vertical camera MTF. The rms noise level of a subset of the pixels within the uniform grey patch 130 are used to measure the camera noise level. The horizontal, vertical, and noise data is then stored in the calibration file 26 in the PROM 28 (FIG. 3) within camera 10.

The invention has been described with reference to a preferred embodiment. However, it will be appreciated that variations and modifications can be effected by a person of ordinary skill in the art without departing from the scope of the invention. For example, the camera, scanner, printer or display may include some nominal level of image sharpening, and the MTF calibration files provided for these components would include the effect of such sharpening operations. Additionally, the MTF calibration files for the camera, scanner, printer, or display could be supplied for existing printers after they are delivered to customers, by providing estimated MTF data for typical devices. These calibration files could be delivered by any digital data storage media, or could be communicated by paper, phone, fax, and electronic communications using modem or other connections to the Internet or other computer-based electronic communications.

PARTS LIST 10 digital camera
12 display
14 printer
16 memory card
18 host computer
20 hardware sharpening filter
22 user selectable sharpening software
24 firmware sharpening filter
26 camera MTF calibration file
28 camera PROM
30 camera computer file
32 printer MTF calibration file
34 printer PROM
36 printer computer file
38 automatic sharpening filter software
40 lens
41 aperture/shutter controller
42 blur filter
44 CCD
46 analog video processor
48 A/D converter
50 frame memory
52 digital signal processor
54 data memory
56 memory card
58 memory card interface
59 card connector
60 host computer interface
62 camera microprocessor
64 user inputs
66 flash unit
68 timing generator
70 photodiode
72 exposure driver
74 sensor driver
78 host computer interface
80 data memory
82 digital signal processor
84 frame memory
86 D/A converter
88 printer engine
90 printer microprocessor
92 user inputs
94 timing generator
96 filter memory
107–116 process steps
120 reflection test target
122 lamps
124 registration mark
126 slanted vertical bar
128 planted horizontal bar
130 grey patch

We claim:

1. A method for sharpening images captured by an imaging device having an electronic imager and subsequently reproduced in a reproduction device, both imaging and reproduction devices having respective spatial response functions, said method comprising the steps of:

storing the imaging device spatial response function;
storing the reproduction device spatial response function;
capturing an image with the imaging device;
generating a system spatial response function from the imaging device spatial response function and the reproduction device spatial response function;
generating a sharpening filter function from the system spatial response function; and
applying the sharpening filter function to the image captured by the imaging device in order to sharpen the image.

2. A method as claimed in claim 1 wherein the spatial response function of both imaging and reproduction devices is a modulation transfer function, and the system spatial response function is a system modulation transfer function.

3. A method as claimed in claim 2 wherein the step of generating a sharpening filter function comprises generating an inverse filter function which produces a substantially flat transfer function when applied to the image.

4. A method as claimed in claim 2 further comprising the steps of:
selecting a size of reproduction; and
scaling the imaging device modulation transfer function for the selected size of reproduction.

5. A method as claimed in claim 1 wherein the reproduction device is a printer.

6. A method as claimed in claim 1 wherein the reproduction device is a display device.

7. A method as claimed in claim 1 wherein the imaging device is a digital camera.

8. A method as claimed in claim 1 wherein the imaging device is a scanner.

9. A method as claimed in claim 2 wherein the step of generating a system modulation transfer function comprises the steps of:
adjusting the frequency axis of the imaging device modulation transfer function to correspond to that of the reproduction device; and
multiplying a correspondingly adjusted imaging device modulation transfer function with the reproduction device modulation transfer function.

10. A method as claimed in claim 2 further including a host computer which receives images captured by the electronic imaging device, generates processed images, and provides the processed images to the reproduction device, wherein the step of generating the system modulation transfer function takes place in the host computer.

11. A method as claimed in claim 10 wherein the imaging device modulation transfer function is stored with the imaging device and provided to the host computer with the image.

12. A method as claimed in claim 10 wherein the imaging device modulation transfer function is stored in a computer file and provided to .the host computer with the image.

13. A method as claimed in claim 10 wherein the imaging device modulation transfer function is electronically communicated to the host computer.

14. A method as claimed in claim 10 wherein the reproduction device modulation transfer function is stored with the reproduction device and downloaded to the host computer.

15. A method as claimed in claim 10 wherein the reproduction device modulation transfer function is stored in a computer file and provided to the host computer.

16. A method as claimed in claim 10 wherein the reproduction device modulation transfer function is electronically communicated to the host computer.

17. A method as claimed in claim 2 wherein the steps of generating the system modulation transfer function, generating the sharpening filter function, and applying the sharpening filter function to the image takes place in the host computer.

18. A method as claimed in claim 17 wherein the imaging device modulation transfer function is stored with the imaging device and provided to the reproduction device with the image.

19. A method as claimed in claim 17 wherein the imaging device modulation transfer function is stored in a computer file and provided to the reproduction device with the image.

20. A method for sharpening images captured by a imaging device having an electronic imager and subsequently reproduced in a reproduction device, both imaging and reproduction devices having respective modulation transfer functions, said method comprising the steps of:
characterizing the modulation transfer function of the imaging device relative to a sampling frequency of the imager;
storing the imaging device modulation transfer function with the imaging device;
characterizing the modulation transfer function of the reproduction device relative to a sampling frequency of the reproduction device;
storing the reproduction device modulation transfer function with the reproduction device;
capturing an image with the imaging device;
selecting a reproduction size;
scaling the imaging device modulation transfer function for the selected reproduction size;
generating a system modulation transfer function from the imaging device modulation transfer function and the reproduction device modulation transfer function;
generating a sharpening function from the system modulation transfer function; and
applying the sharpening filter function to the image captured by the imaging device in order to sharpen the image.

21. A method as claimed in claim 20 wherein the reproduction device is a printer.

22. A method as claimed in claim 20 wherein the reproduction device is a display device.

23. A method as claimed in claim 20 wherein the imaging device is a digital camera.

24. A method as claimed in claim 20 wherein the imaging device is a scanner.

25. A method as claimed in claim 20 wherein the step of generating a system modulation transfer function comprises the steps of:
adjusting the frequency axis of the imaging device modulation transfer function to correspond to that of the reproduction device; and
multiplying a correspondingly adjusted imaging device modulation transfer function with the reproduction device modulation transfer function.

26. An electronic imaging system for capturing, processing, and reproducing images, both capturing and reproducing functions characterized by respective modulation transfer functions, said system comprising:
an electronic imaging device including an imager for capturing the images, said imaging device having an imaging device modulation transfer function and a storage device for storing data representing the imaging device modulation transfer function;

a reproduction device for reproducing the image captured by the imaging device, said reproduction device having a reproduction device modulation transfer function and a storage device for storing data representing the reproduction device modulation transfer function; and a processor for processing the images captured by the imaging device before they are reproduced by the reproduction device; said processor including means for generating a system modulation transfer function from the imaging device modulation transfer function and the reproduction device modulation transfer function, means for generating a sharpening filter function from the system modulation transfer function, and means for applying the sharpening filter function to the images captured by the imaging device in order to sharpen the images.

27. A system as claimed in claim 26 wherein the reproduction device is a printer.

28. A system as claimed in claim 26 wherein the reproduction device is a display device.

29. A system as claimed in claim 26 wherein the imaging device is a digital camera.

30. A system as claimed in claim 26 wherein the imaging device is a scanner.

31. A system as claimed in claim 26 wherein the means for generating a system modulation transfer function comprises:

means for adjusting the frequency axis of the imaging device modulation transfer function to correspond to that of the reproduction device; and means for multiplying a correspondingly adjusted imaging device modulation transfer function with the reproduction device modulation transfer function.

32. A system as claimed in claim 26 wherein the processor is a host computer which receives images captured by the electronic imaging device, generates processed images, and provides the processed images to the reproduction device.

33. A system as claimed in claim 32 wherein the imaging modulation transfer function is stored in internal memory in the imaging device and provided to the host computer in a record combining the image and the data representing the imaging device modulation transfer function.

34. A system as claimed in claim 32 wherein the imaging device modulation transfer function is stored in a computer file provided with the imaging device and provided to the host computer separately from the image.

35. A system as claimed in claim 32 wherein the reproduction device modulation transfer function is stored in internal memory in the reproduction device and downloaded to the host computer.

36. A system as claimed in claim 32 wherein the reproduction device modulation transfer function is stored in a computer file provided with the reproduction device and provided to the host computer.

37. An imaging device for capturing images and supplying the captured images to a computer, said imaging device comprising:

an image sensor positioned in the imaging device for capturing an image;

an optical section for focusing image light from the image upon the image sensor;

a sensor driver for driving the image sensor at a predetermined sampling frequency in order to generate image data;

a memory for storing MTF data representing a modulation transfer function of the image sensor characterized relative to the predetermined sampling frequency of the image sensor; and a processor for generating an imaging device output signal comprised of the image data and the MTF data, whereby the imaging device output signal is made available to the computer.

38. An imaging device as claimed in claim 37 wherein the imaging device is a digital camera.

39. An imaging device as claimed in claim 37 wherein the imaging device is a scanner.

40. A reproduction device for reproducing images supplied by a computer, said reproduction device comprising:

a memory for storing MTF data representing a modulation transfer function of the reproduction device;

an interface for outputting the MTF data to the computer where it is used to generate sharpened images;

a processor for generating a reproduction signal from the sharpened images; and an output generator for generating reproductions of the sharpened images.

41. A reproduction device as claimed in claim 40 wherein the output generator is a printer.

42. A reproduction device as claimed in claim 40 wherein the output generator is a display device.

43. An imaging kit for capturing images and supplying the captured images to a computer, said imaging kit comprising:

an imaging device including an image sensor for capturing an image, an optical section for focusing image light from the image upon the image sensor, a sensor driver for driving the image sensor at a predetermined sampling frequency in order to generate image data, and a processor for generating an imaging device output signal comprised of the image data; and a computer file including a memory for storing MTF data representing a modulation transfer function of the image sensor characterized relative to the predetermined sampling frequency of the image sensor, whereby the imaging device output signal and the computer file is made available to the computer for sharpening the images.

44. An imaging kit as claimed in claim 43 wherein the imaging device is a digital camera.

45. An imaging kit as claimed in claim 43 wherein the imaging device is a scanner.

46. An imaging kit as claimed in claim 43 wherein the computer file is a magnetic disk.

47. A method for enabling the sharpening of images from a digital capture device comprising the steps of:

capturing an image of a test chart incorporating features for measuring the modulation transfer function (MTF) of the capture device;

generating test chart image data;

analyzing the test chart image data to determine the capture device MTF; and providing the MTF data along with the capture device so that subsequently captured images may be sharpened.

48. A method as claimed in claim 47 further comprising the steps of:

using the capture device MTF data to determine a sharpening filter appropriate for the image capture device;

generating image data; and applying the sharpening filter to the image data.

49. A method as claimed in claim 48 further comprising the steps of:

measuring a noise level of the capture device; and limiting a maximum gain of the sharpening filter as a function of the capture device noise level.

50. A method as claimed in claim 1 further comprising the steps of:

measuring a noise level of the imaging device; and limiting a maximum gain of the sharpening filter as a function of the imaging device noise level.

51. A reproduction device for reproducing images captured by an imaging device, said reproduction device comprising:

a memory for storing reproduction MTF data representing a modulation transfer function of the reproduction device;

an interface for inputting imaging MTF data representing a modulation transfer function of the imaging device;

a processor for generating a system modulation transfer function from the imaging MTF data and the reproduction MTF data and a sharpening filter function from the system modulation transfer function;

means for applying the sharpening filter function to the images captured by the imaging device to generate sharpened images; and an output generator for generating reproductions of the sharpened images.

* * * * *